2,975,183

DIPROPIONYL, DIBUTYRYL, AND DIISOBUTYRYL DERIVATIVES OF CORYNANTHINE

Mario Reiser, Wiesbaden, Emil A. Eidebenz, Wiesbaden-Biebrich, and Heinz Georg von Schuh, Wiesbaden, Germany, assignors to Chemische Werke Albert, Wiesbaden-Biebrich, Germany, a corporation of Germany No Drawing. Filed Oct. 13, 1958, Ser. No. 766,725

Claims priority, application Germany Oct. 17, 1957

6 Claims. (Cl. 260—287)

This invention relates to diacyl derivatives of corynanthine and their preparation.

The preparation of the O,N-diacetyl corynanthine by the introduction of acetyl groups into the 1- and 17-positions of the corynanthine is disclosed in Bul. Soc. Chim. T. 10, 383–385, 1943.

Now it has been found that it is possible to acylate corynanthine with acid radicals derived from acids having a higher molecular weight than acetic acid, namely, with acyl radicals derived from aliphatic monocarboxylic acids of formula $R.CH_2.COOH$ wherein R=alkyl. In this way, the O,N diacyl derivatives of the corynanthine are obtained in which the 1- and 17-positions have substituted thereon identical carboxylic acid groups. These derivatives may be prepared by known acylation methods. The corynanthine may be acylated as a free base, but is preferably acylated in the form of a hydrogen halide salt, advantageously in the form of its hydrochloride. In one embodiment of the invention, acylation is accomplished, e.g., by heating the corynanthine-hydrochloride with an acid halide, typically an acid chloride of formula $R.CH_2.COCl$, in excess of that theoretically necessary to form the diacyl derivative. In accordance with another method, the corynanthine salt is acylated by heating it with an acid anhydride of formula $(R.CH_2.CO)_2.O$. It was found desirable in the case of acylation with an acid halide to dilute it, typically an acid chloride, with approximately the same amount of the corresponding acid. In the case of acylation with an acid anhydride, the acid anhydride is most advantageously used in the presence of the alkali metal salt, typically a sodium salt, of the corresponding carboxylic acid.

The corynanthine derivatives obtained in accordance with this invention possess sympathicolytic properties and show therapeutic effects which are surprisingly and significantly superior to, and at times different from, the therapeutic effects produced by the starting material, the corynanthine, and the already known O,N-diacetyl corynanthine. While the O,N-diacetyl corynanthine shows an increase in toxicity as compared to the corynanthine, the compounds prepared in accordance with this invention show simultaneously with their higher activity a lower toxicity. For instance, the O,N-dipropionyl corynanthine shows at an activity which is six times higher than that of the corynanthine and superior also to that of the O,N-diacetyl corynanthine, while it shows a toxicity which is only half of that of the corynanthine and only one-third of that of the O,N-diacetyl compound.

One manner of testing the sympathicolytic potency of the diacylates of this invention as compared to that of corynanthine and its known diacetyl derivative is to measure the time lapse from the beginning to the end of blood pressure reversion induced by their administration after previous administration of adrenalin.

Preliminary tests indicate that the diacylates of this invention may be used for diagnostic purposes.

Also, the higher acylates of this invention may be used for purposes for which the diacetylates of the prior art are unacceptable.

The following illustrative examples will serve to facilitate an understanding of the invention.

Example 1

A mixture of 10 g. corynanthine hydrochloride, 30 ml. propionic acid and 30 ml. propionyl chloride is heated under reflux for 3 hours. The solvent is distilled off: the residue is taken up in benzene/cyclohexane (1:1) and filtered. A yield of 6.5 g. O,N-dipropionyl corynanthine hydrochloride is obtained. The substance decomposes after recrystallization from isopropanol at 236–237° C. The free base having a M.P. of 152–154° C. is obtained by precipitating it from a solution of the salt by the addition of ammonium hydroxide.

Example 2

A mixture of 5 g. corynanthine hydrochloride, 5 g. sodium propionate and 75 ml. propionic acid anhydride is heated under reflux for nine hours. After removing the anhydride, the residue is dissolved in water and the free base is precipitated therefrom with ammonium hydroxide. After drying and recrystallizing from isopropanol, the M.P. of the crystalline compound is 152–154° C.

Example 3

A mixture of 5 g. corynanthine hydrochloride, 30 ml. butyric acid and 30 ml. butyryl chloride is heated to 100° C. for four hours. The solvent is evaporated under vacuum, the residue is taken up in benzene and precipitated with cyclohexane. After recrystallization from benzene, 1.6 g. O,N-di-n-butyryl corynanthine hydrochloride, having a M.P. of 208–210° C. were obtained.

The free base may be prepared in the manner disclosed above and has a M.P. of 113–115°.

Example 4

A mixture of 5 g. corynanthine base, 30 ml. isobutyric acid, 30 ml. isobutyryl chloride and 10 ml. trichloroethylene is heated to 100° C. for four hours with stirring. The mixture is evaporated to dryness, dissolved in benzene and cyclohexane is added in just such a quantity that no precipitate is formed. The O,N-di-isobutyryl corynanthine separates on heating in the form of finely granulated powder. After recrystallization from tetrahydrofurane, containing a small amount of water, 2 g. of pure substance decomposing at 245–246° C. is obtained.

The preceding examples have disclosed processes for introducing into corynanthine two acyl radicals of the formula $RCH_2CO$, where R is a low molecular alkyl radical of 1 to 3 carbon atoms, but it will be understood that these examples are merely illustrative and that the procedures described therein can be used to produce diacylates of corynanthine containing other low molecular alkyl radicals in their acyl radicals and that these processes, or modifications thereof, can be used to produce diacylates of corynanthine containing alkyl radicals of an intermediate or a higher molecular weight in their acyl radicals.

It will be apparent to those skilled in the art that embodiments of the invention, other than those described in the examples for illustrative purposes, may be evolved and that modifications in the illustrative embodiments may be made without departing from the spirit and scope of the invention as expressed above and as defined in the appended claims.

What is claimed is:

1. The O,N-diacyl derivative of a compound selected from the group consisting of corynanthine and corynanthine hydrochloride wherein each acyl radical is the same and is selected from the group consisting of $CH_3CH_2CO-$, $CH_3CH_2CH_2CO-$ and $(CH_3)_2CHCO-$.

2. The compound, O,N-dipropionyl corynanthine.
3. The compound, O,N-di-n-butyryl corynanthine.
4. The compound, O,N-di-n-butyryl corynanthine hydrochloride.
5. The comound O,N-di-isobutyryl corynanthine.
6. The compound O,N-di-isobutyryl corynanthine hydrochloride.

References Cited in the file of this patent

Janot: Bul. Soc. Chim. France, T. 10, pp. 383–385 (1943).